(12) United States Patent
Weiner

(10) Patent No.: US 10,352,191 B2
(45) Date of Patent: Jul. 16, 2019

(54) GAS TURBINE ENGINE WITH AIR-OIL COOLER OIL TANK

(71) Applicant: United Technologies Corporation, Hartford, CT (US)

(72) Inventor: Richard A. Weiner, Farmington, CT (US)

(73) Assignee: United Technologies Corporation, Farmington, CT (US)

( * ) Notice: Subject to any disclaimer, the term of this patent is extended or adjusted under 35 U.S.C. 154(b) by 399 days.

(21) Appl. No.: 14/775,885

(22) PCT Filed: Mar. 13, 2014

(86) PCT No.: PCT/US2014/026244
§ 371 (c)(1),
(2) Date: Sep. 14, 2015

(87) PCT Pub. No.: WO2014/151685
PCT Pub. Date: Sep. 25, 2014

(65) Prior Publication Data
US 2016/0024964 A1   Jan. 28, 2016

Related U.S. Application Data

(60) Provisional application No. 61/787,070, filed on Mar. 15, 2013.

(51) Int. Cl.
*F01D 25/12* (2006.01)
*F02C 7/14* (2006.01)
(Continued)

(52) U.S. Cl.
CPC ............... *F01D 25/12* (2013.01); *F01D 9/02* (2013.01); *F01D 15/12* (2013.01); *F01D 17/105* (2013.01); *F01D 25/18* (2013.01); *F01D 25/24* (2013.01); *F02C 7/14* (2013.01);

*F02K 3/115* (2013.01); *F16N 19/00* (2013.01); *F05D 2220/32* (2013.01); *F05D 2260/213* (2013.01); *F05D 2260/22141* (2013.01);
(Continued)

(58) Field of Classification Search
CPC ........ F01D 25/12; F01D 15/12; F01D 17/105; F01D 25/24; F01D 25/18; F01D 9/02; F02K 3/115; F16N 19/00; F02C 7/14; F05D 2220/32; F05D 2260/40311; F05D 2260/98; F05D 2260/22141; F05D 2260/213
See application file for complete search history.

(56) References Cited

U.S. PATENT DOCUMENTS 3,540,682 A * 11/1970 Howard .................. F01D 5/022
244/53 R
3,797,561 A   3/1974 Clark et al.
(Continued)

FOREIGN PATENT DOCUMENTS

GB   1358076   6/1974

OTHER PUBLICATIONS

EP search report for EP14768138.1 dated Oct. 18, 2016.

*Primary Examiner* — Eldon T Brockman
(74) *Attorney, Agent, or Firm* — O'Shea Getz P.C.

(57) ABSTRACT

A thermal management system according to one disclosed non-limiting embodiment of the present disclosure includes an at least partially annular oil tank; and a fan airflow diverter upstream of the cooling fins.

9 Claims, 7 Drawing Sheets

(51) Int. Cl.
- *F16N 19/00* (2006.01)
- *F01D 9/02* (2006.01)
- *F01D 15/12* (2006.01)
- *F01D 17/10* (2006.01)
- *F01D 25/18* (2006.01)
- *F01D 25/24* (2006.01)
- *F02K 3/115* (2006.01)

(52) U.S. Cl.
CPC .......... *F05D 2260/40311* (2013.01); *F05D 2260/98* (2013.01); *Y02T 50/671* (2013.01); *Y02T 50/676* (2013.01)

(56) References Cited

U.S. PATENT DOCUMENTS

| | | | | |
|---|---|---|---|---|
| 3,925,979 | A * | 12/1975 | Ziegler | F02C 7/047 244/134 R |
| 4,137,705 | A * | 2/1979 | Andersen | F02C 7/14 60/39.08 |
| 4,151,710 | A * | 5/1979 | Griffin | F02C 7/14 184/6.11 |
| 4,254,618 | A * | 3/1981 | Elovic | F02C 7/185 60/226.1 |
| 4,856,273 | A | 8/1989 | Murray | |
| 5,269,135 | A * | 12/1993 | Vermejan | F02C 7/04 60/226.1 |
| 5,438,823 | A | 8/1995 | Loxley et al. | |
| 6,106,229 | A | 8/2000 | Nikkanen et al. | |
| 6,282,881 | B1 | 9/2001 | Beutin et al. | |
| 6,415,595 | B1 | 7/2002 | Wilmot et al. | |
| 6,939,392 | B2 | 9/2005 | Huang et al. | |
| 6,968,697 | B2 | 11/2005 | Nguyen et al. | |
| 6,971,241 | B2 | 12/2005 | Critchley et al. | |
| 6,994,155 | B2 | 2/2006 | Dessiatoun et al. | |
| 7,140,174 | B2 | 11/2006 | Johnson | |
| 7,260,926 | B2 | 8/2007 | Sabatino et al. | |
| 7,377,100 | B2 * | 5/2008 | Bruno | F01D 25/12 60/266 |
| 7,475,549 | B2 | 1/2009 | Alexander et al. | |
| 7,624,592 | B2 | 12/2009 | Lui et al. | |
| 7,857,257 | B2 | 12/2010 | Schwarz | |
| 7,861,512 | B2 * | 1/2011 | Olver | F02C 7/14 60/226.1 |
| 7,984,606 | B2 | 7/2011 | Smith | |
| 8,066,472 | B2 | 11/2011 | Coffin et al. | |
| 8,127,828 | B2 * | 3/2012 | Schwarz | F01D 5/046 165/41 |
| 8,127,829 | B2 | 3/2012 | Sabatino et al. | |
| 8,261,527 | B1 | 9/2012 | Stearns et al. | |
| 8,262,344 | B2 | 9/2012 | Alexander et al. | |
| 8,490,382 | B2 * | 7/2013 | Zysman | F02C 7/14 60/204 |
| 8,721,271 | B2 * | 5/2014 | Wang | F01D 25/12 415/177 |
| 8,784,047 | B2 * | 7/2014 | Elder | F02K 3/115 415/116 |
| 8,938,944 | B2 * | 1/2015 | Todorovic | F02C 7/14 184/6.11 |
| 8,967,958 | B2 * | 3/2015 | Bajusz | F02C 7/14 415/178 |
| 9,200,570 | B2 * | 12/2015 | Alecu | F02K 3/115 |
| 9,243,563 | B2 * | 1/2016 | Lo | F02C 7/18 |
| 9,267,390 | B2 * | 2/2016 | Lo | F02C 6/08 |
| 2007/0215326 | A1 * | 9/2007 | Schwarz | F01D 5/046 165/96 |
| 2008/0053059 | A1 * | 3/2008 | Olver | F02C 7/14 60/226.1 |
| 2008/0095611 | A1 * | 4/2008 | Storage | F01D 25/125 415/116 |
| 2009/0007567 | A1 * | 1/2009 | Porte | F02C 7/141 60/785 |
| 2010/0180571 | A1 * | 7/2010 | Zysman | F02C 7/14 60/204 |
| 2011/0135455 | A1 * | 6/2011 | Wang | F01D 25/12 415/178 |
| 2011/0150634 | A1 * | 6/2011 | Bajusz | F02C 7/14 415/145 |
| 2011/0185731 | A1 * | 8/2011 | Mylemans | F01D 25/18 60/645 |
| 2012/0060466 | A1 * | 3/2012 | Schwarz | F01D 5/046 60/226.1 |
| 2012/0168115 | A1 * | 7/2012 | Raimarckers | F01D 25/02 165/41 |
| 2012/0285138 | A1 * | 11/2012 | Todorovic | F02C 7/14 60/230 |
| 2013/0186102 | A1 * | 7/2013 | Lo | F02C 7/18 60/785 |
| 2013/0219854 | A1 * | 8/2013 | Alecu | F02K 3/115 60/204 |
| 2013/0247587 | A1 * | 9/2013 | Lo | F01D 17/105 60/806 |
| 2013/0291514 | A1 | 11/2013 | Suciu et al. | |
| 2014/0010639 | A1 | 1/2014 | Snape et al. | |
| 2015/0322854 | A1 | 11/2015 | Suciu et al. | |

\* cited by examiner

GAS TURBINE ENGINE WITH AIR-OIL COOLER OIL TANK

This application claims priority to PCT Patent Appln. No. PCT/US14/26244 filed Mar. 13, 2014, which claims priority to U.S. Patent Appln. No. 61/787,070 filed Mar. 15, 2013.

BACKGROUND

The present disclosure relates to a gas turbine engine and, more particularly, to an air-oil cooler oil tank system therefor.

Gas turbine aero engines, such as those which power modern commercial and military aircraft, include a compressor section to pressurize a supply of air, a combustor section to burn a hydrocarbon fuel in the presence of the pressurized air, and a turbine section to extract energy from the resultant combustion gases and generate thrust.

An aero engine fluid system typically includes a multiple of air-oil coolers and fuel-oil coolers and associated equipment to exchange engine heat with airflow, fuel flow, and/or oil flow.

SUMMARY

An air-oil cooler oil tank system according to one disclosed non-limiting embodiment of the present disclosure includes an at least partially annular oil tank and a fan airflow diverter upstream of the at least partially annular oil tank.

In a further embodiment of the present disclosure, the at least partially annular oil tank is in fluid communication with the geared architecture.

A further embodiment of any of the foregoing embodiments of the present disclosure includes an array of cooling fins defined about an outer diameter of the at least partially annular oil tank, and the fan airflow diverter is in communication with the array of cooling fins.

In a further embodiment of any of the foregoing embodiments of the present disclosure, the array of cooling fins includes a shroud that is flush along a fan bypass flowpath.

In a further embodiment of any of the foregoing embodiments of the present disclosure, the array of cooling fins includes a shroud that is flush with a core nacelle.

In a further embodiment of any of the foregoing embodiments of the present disclosure, the array of cooling fins is downstream of a Fan Exit Guide Vane array.

In a further embodiment of any of the foregoing embodiments of the present disclosure, the array of cooling fins are defined about an outer periphery of the at least partially annular oil tank.

A further embodiment of any of the foregoing embodiments of the present disclosure includes a 2.5 bleed compartment that contains the fan airflow diverter and the at least partially annular oil tank.

A further embodiment of any of the foregoing embodiments of the present disclosure includes a shield radially inboard of the at least partially annular oil tank.

In a further embodiment of any of the foregoing embodiments of the present disclosure, the at least partially annular oil tank is manufactured of a multiple of arcuate segments.

A gas turbine engine according to another disclosed non-limiting embodiment of the present disclosure includes an at least partially annular oil tank with an array of cooling fins that include a shroud adjacent to a fan bypass flowpath.

In a further embodiment of any of the foregoing embodiments of the present disclosure, the at least partially annular oil tank is in oil communication with the geared architecture.

In a further embodiment of any of the foregoing embodiments of the present disclosure, the at least partially annular oil tank surrounds an engine central longitudinal axis.

In a further embodiment of any of the foregoing embodiments of the present disclosure, the shroud is flush along a radial inner boundary of the fan bypass flowpath.

In a further embodiment of any of the foregoing embodiments of the present disclosure, the at least partially annular oil tank is located within a 2.5 bleed compartment.

A further embodiment of any of the foregoing embodiments of the present disclosure includes a fan airflow diverter upstream of the at least partially annular oil tank.

In a further embodiment of any of the foregoing embodiments of the present disclosure, the fan airflow diverter selectively extends radially outward from the core nacelle to direct an airflow over the cooling fins.

A method of air-oil cooling for a geared architecture gas turbine engine according to another disclosed non-limiting embodiment of the present disclosure includes extending a fan airflow diverter; and communicating a portion of a bypass airflow through the fan airflow diverter and an array of cooling fins that extend from an at least partially annular oil tank.

A further embodiment of any of the foregoing embodiments of the present disclosure includes extending the fan airflow diverter radially outward from a core nacelle.

A further embodiment of any of the foregoing embodiments of the present disclosure includes communicating the portion of the bypass airflow through the array of cooling fins and within a shroud around the array of cooling fins.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
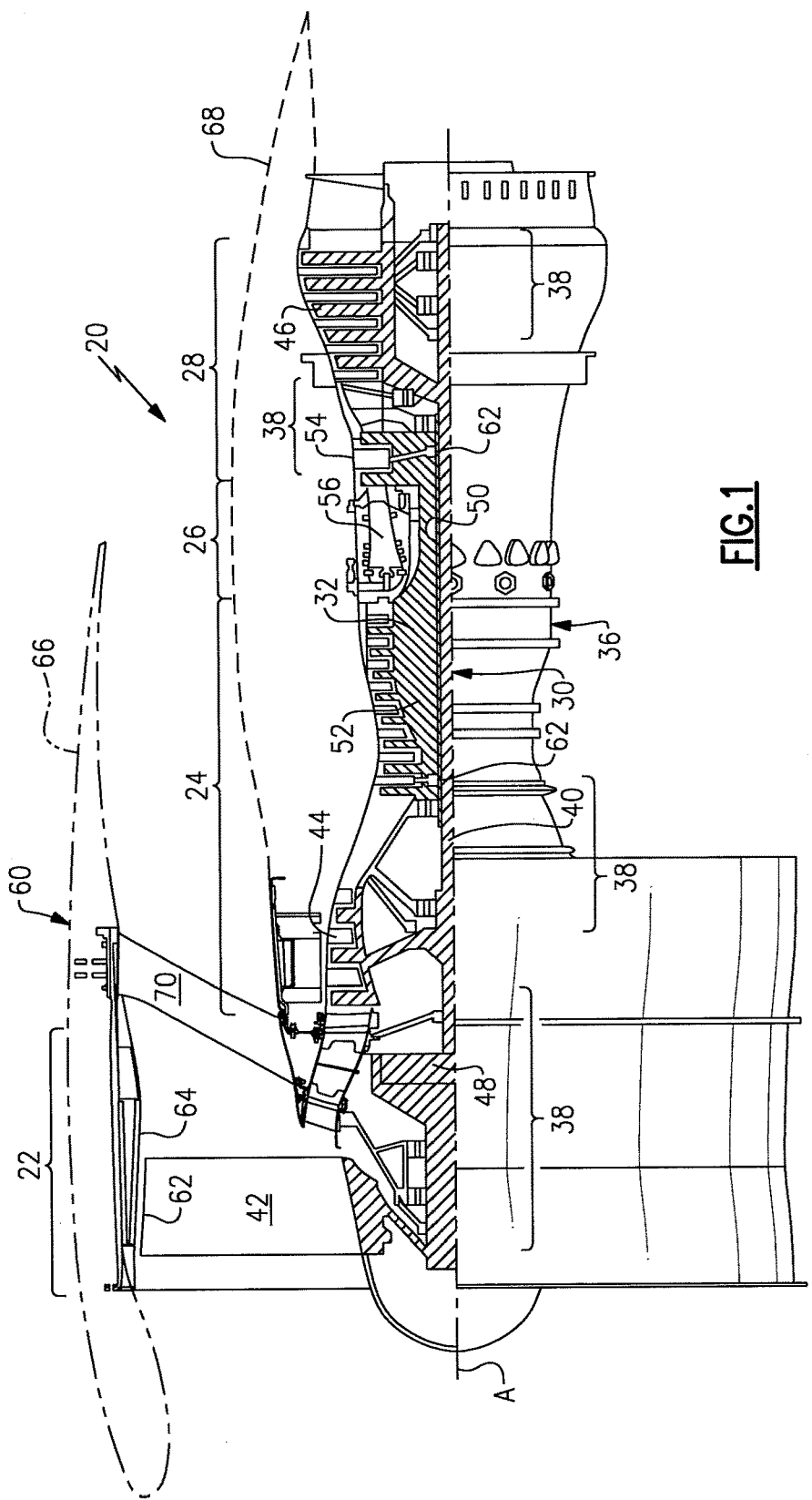
FIG. 1 is a schematic cross-section of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a fan bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be appreciated that the concepts described herein are not limited to use with turbofans as the teachings may be applied to other types of turbine engines such as a three-spool (plus fan) engine wherein an intermediate spool includes an intermediate pressure compressor (IPC) between the LPC and HPC and an intermediate pressure turbine (IPT) between the HPT and LPT.

The engine 20 generally includes a low spool 30 and a high spool 32 mounted for rotation about an engine central longitudinal axis A relative to an engine case assembly 36 via several bearing compartments 38. The low spool 30 generally includes an inner shaft 40 that interconnects a fan 42, a low pressure compressor ("LPC") 44 and a low pressure turbine ("LPT") 46. The inner shaft 40 drives the fan 42 through a geared architecture 48 to drive the fan 42 at a lower speed than the low spool 30.

The high spool 32 includes an outer shaft 50 that interconnects a high pressure compressor ("HPC") 52 and high pressure turbine ("HPT") 54. A combustor 56 is arranged between the high pressure compressor 52 and the high pressure turbine 54. The inner shaft 40 and the outer shaft 50 are concentric and rotate about the engine central longitudinal axis A that is collinear with their longitudinal axes.

Core airflow is compressed by the LPC 44 then the HPC 52, mixed with the fuel and burned in the combustor 56, then expanded over the HPT 54 and the LPT 46. The turbines 54, 46 rotationally drive the respective low spool 30 and high spool 32 in response to the expansion.

In one non-limiting embodiment, the gas turbine engine 20 is a high-bypass geared architecture engine in which the bypass ratio is greater than about six (6:1). The geared architecture 48 can include an epicyclic gear train, such as a planetary gear system, star gear system or other gear system. The example epicyclic gear train has a gear reduction ratio of greater than about 2.3, and in another example is greater than about 2.5. The geared turbofan enables operation of the low spool 30 at higher speeds which can increase the operational effectiveness of the LPC 44 and LPT 46 to render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting embodiment, the bypass ratio of the gas turbine engine 20 is greater than about ten (10:1), the fan diameter is significantly larger than that of the LPC 44, and the LPT 46 has a pressure ratio that is greater than about five (5:1). It should be appreciated, however, that the above parameters are only exemplary of one embodiment of a geared architecture engine and that the present disclosure is applicable to other gas turbine engines including direct drive turbofans.

The high bypass ratio results in a significant amount of thrust. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of ("Tram"/518.7)$^{0.5}$. The Low Corrected Fan Tip Speed according to one non-limiting embodiment of the example gas turbine engine 20 is less than about 1150 fps (351 m/s).

The fan section 22 generally includes a fan containment case 60 within which the fan blades 42 are contained. Tips 62 of the fan blades 42 run in close proximity to an inboard surface 64 of the fan containment case 60. The fan containment case 60 is enclosed within an aerodynamic fan nacelle 66 (illustrated schematically) that at least partially surrounds an aerodynamic core nacelle 68 (illustrated schematically). The fan containment case 60 and aerodynamic fan nacelle 66 are supported by circumferentially spaced structures 70 often referred to as Fan Exit Guide Vanes (FEGVs).

Figure 2:
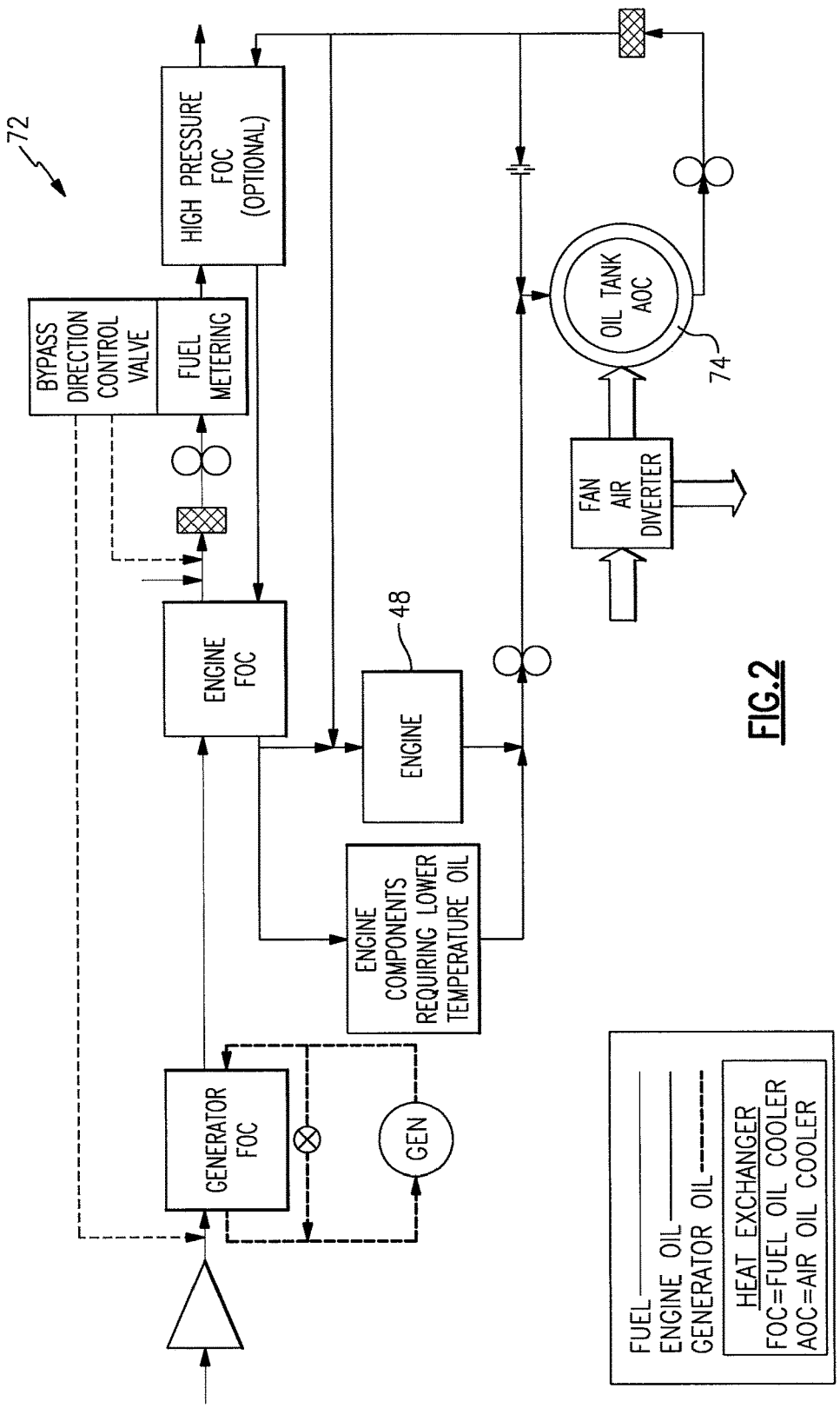
FIG. 2 is a schematic view of the oil tank/AOC/fan airflow diverter implemented into a simplified integrated gas turbine engine thermal management system, lubrication system, generator cooling system and fuel system.

With reference to FIG. 2, a fluid system generally includes an air-oil cooler oil tank system 72 to provide, for example, oil under pressure to lubricate and cool components of the engine 20, such as, for example, the geared architecture 48 and/or the several bearing compartments 38. The air-oil cooler oil tank system 72 also operates as an air-oil cooler to provide thermal transfer between air and oil. It should be appreciated that other fluids such as fuel, engine oil, generator oil, and hydraulic fluid will also benefit herefrom.

Figure 3:
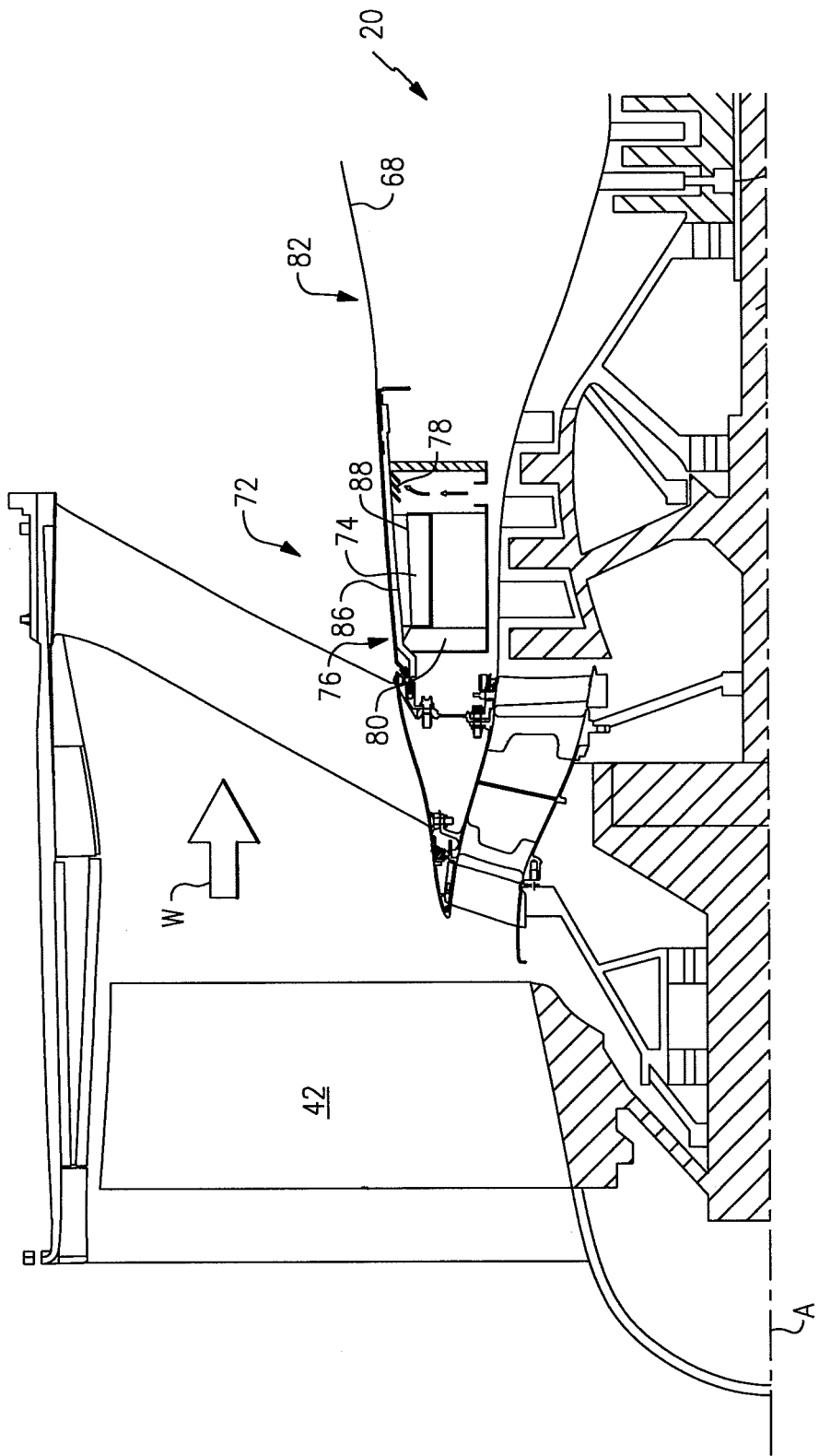
FIG. 3 is an expanded schematic cross-section of the gas turbine engine with an integrated air oil cooler oil tank that is at least partially annular.

With reference to FIG. 3, the air-oil cooler oil tank system 72 in one disclosed non-limiting embodiment includes an oil tank 74 that is at least partially annular (also shown in FIG. 4) and a fan airflow diverter 76 within, for example, an annular 2.5 bleed compartment 80. It should be appreciated that although an annular 2.5 bleed compartment 80 is illustrated in the disclosed non-limiting embodiment, various compartments will also benefit herefrom.

The oil tank 74 is located along a radial inner boundary 82 of the core nacelle 68 downstream of the fan blades 42 along a fan bypass flowpath W. The oil tank 74 is dual purposed as an air-oil cooler to reject heat from engine oil within the oil tank 74 to fan airflow in the fan bypass flowpath W. It should be appreciated that although particular oil tank 74 fluid port arrangements are depicted, various fluid and vent port locations may alternatively or additionally be provided. Furthermore, other oil tank 74 features such as internal oil-side fins may be utilized herewith.

Figure 4:
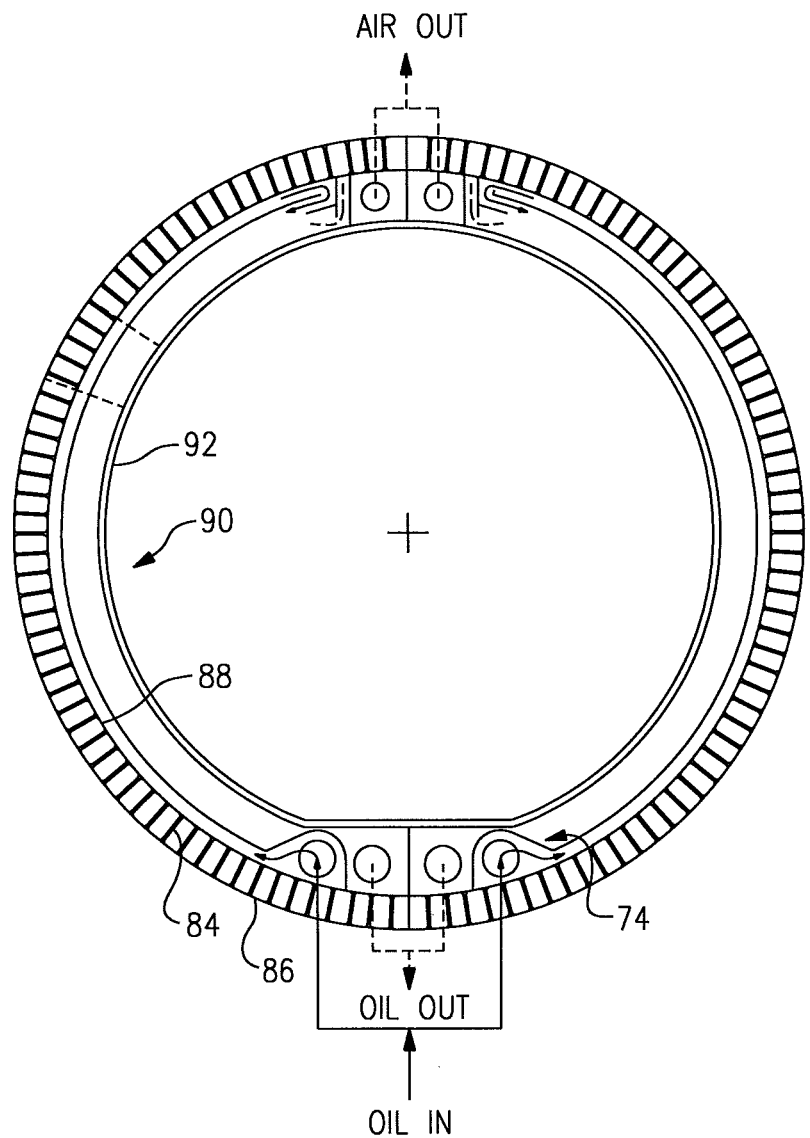
FIG. 4 is a front view of an integrated air oil cooler oil tank according to one disclosed non-limiting embodiment.

In one disclosed non-limiting embodiment, the oil tank 74 includes an array of cooling fins 84 within a shroud 86 (FIG. 4). The shroud 86 is flush and forms a portion of the core nacelle 68. That is, the array of cooling fins 84 are radially extend from an outer periphery 88 of the oil tank 74 such that the shroud 86 is essentially in line with the core nacelle 68 to form a portion of the radial inner boundary 82 of the fan bypass flowpath W.

Figures 5, 6, 7:
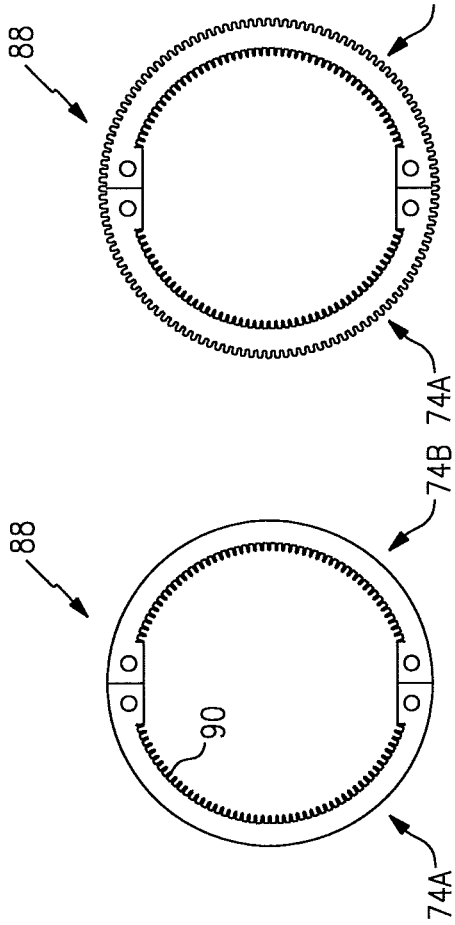
FIG. 5 is a front view of an integrated air oil cooler oil tank according to one disclosed non-limiting embodiment.
FIG. 6 is a front view of integrated air oil cooler oil tank according to one disclosed non-limiting embodiment.
FIG. 7 is a front view of integrated air oil cooler oil tank according to one disclosed non-limiting embodiment.
Figure 11:
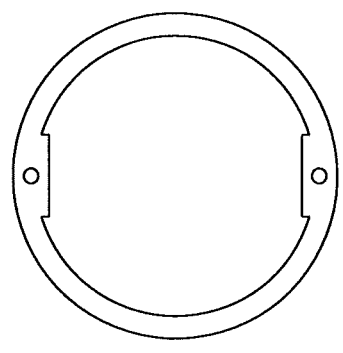
FIG. 11 is a front view of an integrated air oil cooler oil tank according to one disclosed non-limiting embodiment.
Figure 10:
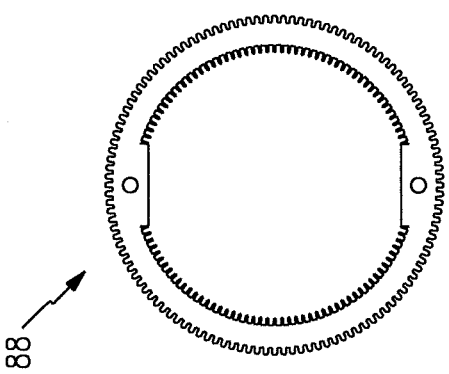
FIG. 10 is a front view of an integrated air oil cooler oil tank according to one disclosed non-limiting embodiment.
Figure 9:
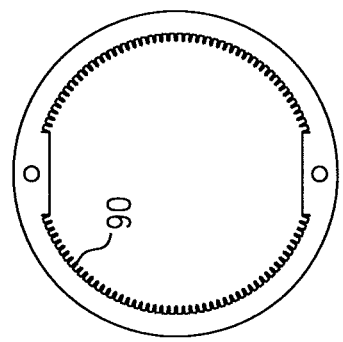
FIG. 9 is a front view of an integrated air oil cooler oil tank according to one disclosed non-limiting embodiment.
Figure 8:
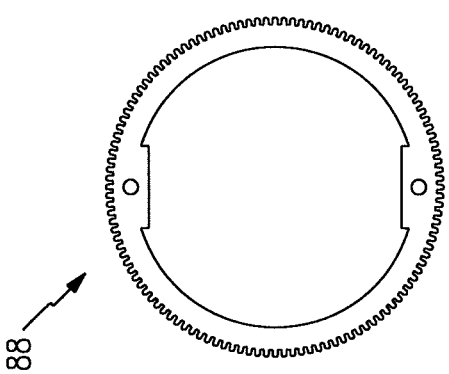
FIG. 8 is a front view of an integrated air oil cooler oil tank according to one disclosed non-limiting embodiment.

In another disclosed non-limiting embodiment, the array of cooling fins 84 are located around an inner periphery 90 of the oil tank 74 (FIG. 5); both the outer periphery 88 and the inner periphery 90 (FIG. 6); or without cooling fins (FIG. 7). In these FIG. 4-7 disclosed non-limiting embodiments, the oil tank 74 is split into two about 180 degree segments 74A, 74B. Each segment 74A, 74B may be split vertically (shown) or horizontally such that each segment 74A, 74B supports maintainability and provides oil to a single oil system, two independent oil systems or a single oil system with a redundant capability. Alternately, the annular oil tank can be segmented into multiple sections, each section serving as a tank and/or cooler for a different type of fluid. Non-split tanks (FIG. 8-11) are lower in cost and weight, but may have reduced maintenance accessibility.

With continued reference to FIG. 3, a shield 92 is located within the inner periphery 90 to protect the oil tank 74 within the annular 2.5 bleed compartment 80. The shield 92 operates to protect the oil tank 74 from, for example, debris discharged from a 2.5 bleed valve 94 (illustrated schematically). Typically, the 2.5 bleed valve 94 such as a port in the compressor casing that opens via a movable valve element (not shown) is open under low engine power conditions. The shield 92 may also provide insulation to reduce heat transfer between the core engine and the oil tank 74. Alternatively, or in addition thereto, the shield 92 operates as a firewall.

Figure 12:
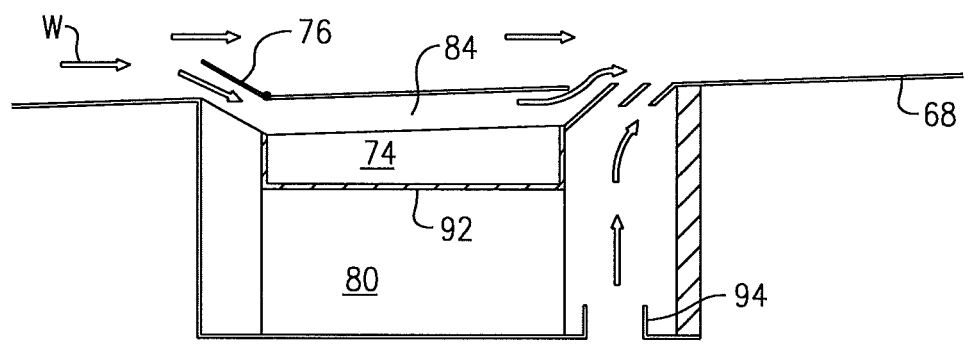
FIG. 12 is an expanded schematic cross-section of an integrated air oil cooler oil tank with an upstream fan airflow diverter in an open position.
Figure 13:
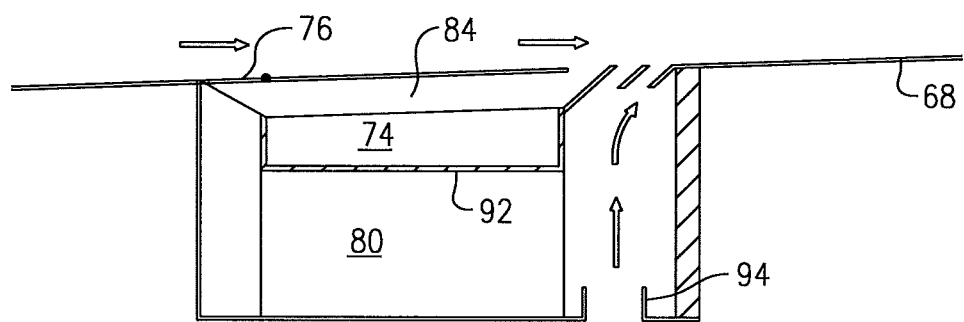
FIG. 13 is an expanded schematic cross-section of the integrated air oil cooler oil tank with the fan airflow diverter in a closed position.

With reference to FIG. 12, the fan airflow diverter 76 may be defined around the entire periphery of the core nacelle 68 or circumferentially segmented therearound to communicates a portion of the bypass airflow through the array of cooling fins 84. That is, a single or multiple intake flaps may be defined through the core nacelle 68 to define a passage through the array of cooling fins 84. The fan airflow diverter 76 is selectively movable between an open position (FIG. 12) and a closed position (FIG. 13).

The fan airflow diverter 76 also communicates the bypass airflow from the array of cooling fins 84 back to the fan bypass flowpath W. That is, the portion of the bypass airflow is only diverted through the array of cooling fins 84. It should be appreciated that although the array of cooling fins 84 are illustrated outboard of the oil tank 74 in the disclosed non-limiting embodiment, the airflow path defined by the fan airflow diverter 76 may alternatively or additionally be radially inboard of the oil tank 74. That is, the fan airflow diverter 76 may define various airflow paths.

The fan airflow diverter 76 modulates open to direct the portion of fan airflow through the shrouded cooling fins 84 when additional engine oil cooling is required to, for example, maintain a desired main oil temperature (MOT). The fan airflow diverter 76 need only be modulated open—and thereby only restrict fan airflow—when additional cooling is specifically required. In other words, when additional air-oil cooling is required, the fan airflow diverter 76 is modulated open, with some TSFC impact is incurred. When additional air-oil cooling is not required, the fan airflow diverter 76 is modulated closed such that no TSFC impact is incurred (FIG. 13).

The air-oil cooler oil tank system 72 also provides "free" heat rejection when heat is transferred from the oil to the oil tank 74 thence to the cooling fins 84. The air-oil cooler oil tank system 72 facilitates an increase in heat rejection with a forced convection outer surface that forms an integral portion of the radial inner boundary 82 of the fan bypass flowpath W.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. An air-oil cooler oil tank system comprising:
   a bypass duct;
   a cooler duct comprising a cooler duct outlet;
   an annular oil tank adjacent the cooler duct;
   a fan airflow diverter at an end of the cooler duct and upstream of said annular oil tank;
   a bleed compartment which contains said fan airflow diverter and said annular oil tank;
   the cooler duct configured to receive air through the fan airflow diverter from the bypass duct and direct the received air axially along the annular oil tank through the cooler duct outlet and back into the bypass duct; and a bleed duct comprising a bleed duct outlet, the bleed duct configured to direct bleed air through the bleed duct outlet into the bypass duct, and the bleed duct outlet adjacent to and downstream of the cooler duct outlet.

2. The system as recited in claim 1, wherein said annular oil tank is in fluid communication with a geared architecture.

3. The system as recited in claim 1, further comprising an array of cooling fins defined about an outer diameter of said annular oil tank, said fan airflow diverter in communication with said array of cooling fins.

4. The system as recited in claim 3, wherein said array of cooling fins include a shroud that is flush along a fan bypass flowpath.

5. The system as recited in claim 3, wherein said array of cooling fins include a shroud that is flush with a core nacelle.

6. The system as recited in claim 3, wherein said array of cooling fins are downstream of a Fan Exit Guide Vane array.

7. The system as recited in claim 3, wherein said array of cooling fins are defined about an outer periphery of said annular oil tank.

8. The system as recited in claim 1, further comprising a shield radially inboard of said annular oil tank.

9. The system as recited in claim 1, wherein said annular oil tank is manufactured of a multiple of arcuate segments.

* * * * *